United States Patent
Tanaka (10) Patent No.: US 9,917,996 B2
(45) Date of Patent: Mar. 13, 2018

(54) IMAGE PICKUP DEVICE

(71) Applicant: Panasonic Intellectual Property Management Co., Ltd., Osaka (JP)

(72) Inventor: Yoshito Tanaka, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/429,358

(22) Filed: Feb. 10, 2017

(65) Prior Publication Data

US 2017/0264798 A1 Sep. 14, 2017

Related U.S. Application Data

(63) Continuation of application No. PCT/JP2016/003825, filed on Aug. 23, 2016.

(30) Foreign Application Priority Data

Mar. 10, 2016 (JP) ................................ 2016-046740

(51) Int. Cl.
*H04N 5/225* (2006.01)
(52) U.S. Cl.
CPC ................. *H04N 5/2256* (2013.01)
(58) Field of Classification Search
CPC .................................................. H04N 5/2256
See application file for complete search history.

(56) References Cited

U.S. PATENT DOCUMENTS

| 7,126,727 | B2 | 10/2006 | Mase |
| 7,623,689 | B2 | 11/2009 | Shigeta |
| 8,261,989 | B2 | 9/2012 | Huemoeller |
| 8,986,882 | B2 * | 3/2015 | Ito ........................... H01M 4/66 427/58 |

(Continued)

FOREIGN PATENT DOCUMENTS

| JP | 09-211745 | 8/1997 |
| JP | 2003-78717 | 3/2003 |

(Continued)

OTHER PUBLICATIONS

International Search Report dated Nov. 8, 2016 in International (PCT) Application No. PCT/JP2016/003825.

*Primary Examiner* — James Hannett
(74) *Attorney, Agent, or Firm* — Wenderoth, Lind & Ponack, L.L.P.

(57) ABSTRACT

An image pickup device (10) includes: an image pickup section (11) that captures an image of an object (16); an illumination section (12) that irradiates the object (16) with light to cast a shadow over the object (16); and a calculator that calculates an illumination optical path (25) extending from a virtual illumination (20). Furthermore, the image pickup device (10) includes: a first conveyer (14) that moves the image pickup section (11) and the illumination section (12) in a first direction when the image pickup section (11) scans the object (16) to capture the image of the object (16); and a second conveyer (15) that moves the light from the illumination section (12) into a plane containing the illumination optical path (25), in accordance with the movement of the image pickup section (11) and the illumination section (12) in the first direction.

5 Claims, 12 Drawing Sheets

(56) References Cited

U.S. PATENT DOCUMENTS

2003/0053149 A1 3/2003 Mase
2013/0242137 A1 9/2013 Kirkland
2017/0295323 A1* 10/2017 Millar ................ H04N 5/23296

FOREIGN PATENT DOCUMENTS

| JP | 2005-174280 | 6/2005 |
| JP | 2009-537915 | 10/2009 |
| JP | 4373492 | 11/2009 |

* cited by examiner

IMAGE PICKUP DEVICE

BACKGROUND

1. Technical Field

The present disclosure relates to an image pickup device that provides an image of an object in which a shadow is created in accordance with illumination for an exhibition.

2. Description of the Related Art

PTL 1 discloses a line scanner that, when scanning an object, irradiates the object with light from a light source such that shadows of projections included in the object are uniformly created, thereby providing an image with a uniform shadow.

CITATION LIST

Patent Literature

PTL 1: Japanese Patent No. 4,373,492

SUMMARY

The present disclosure provides an image pickup device that is capable of providing an image of an object in which a shadow is created in accordance with illumination for an exhibition.

An image pickup device according to the present disclosure includes: an image pickup section that captures an image of an object; an illumination section that irradiates the object with light to cast a shadow over the object; and a calculator that calculates an illumination optical path extending from a virtual illumination. The image pickup device according to the present disclosure further includes: a first conveyer that moves the image pickup section and the illumination section in a first direction when the image pickup section scans the object to capture the image of the object; and a second conveyer that moves the light from the illumination section into a plane containing the illumination optical path, in accordance with the movement of the image pickup section.

According to the present disclosure, an image pickup device is capable of providing an image of an object in which a shadow is created in accordance with illumination for an exhibition.

DETAILED DESCRIPTION

Some exemplary embodiments will be described below in detail with appropriate reference to the accompanying drawings. In some cases, detailed description will be omitted more than necessary. For example, details of a matter already known in the art will not be described, and constituent elements substantially the same as those already described will not be described again. The reason is to prevent the following description from being needlessly redundant, facilitating an understanding of those skilled in the art.

The inventor(s) of the present disclosure provides (provide) the accompanying drawings and the following description for the purpose of helping those skilled in the art sufficiently understand the present disclosure, and therefore the accompanying drawings and the following description are not intended to limit a subject matter described in the claims

Problem with Conventional Art

Figure 2:
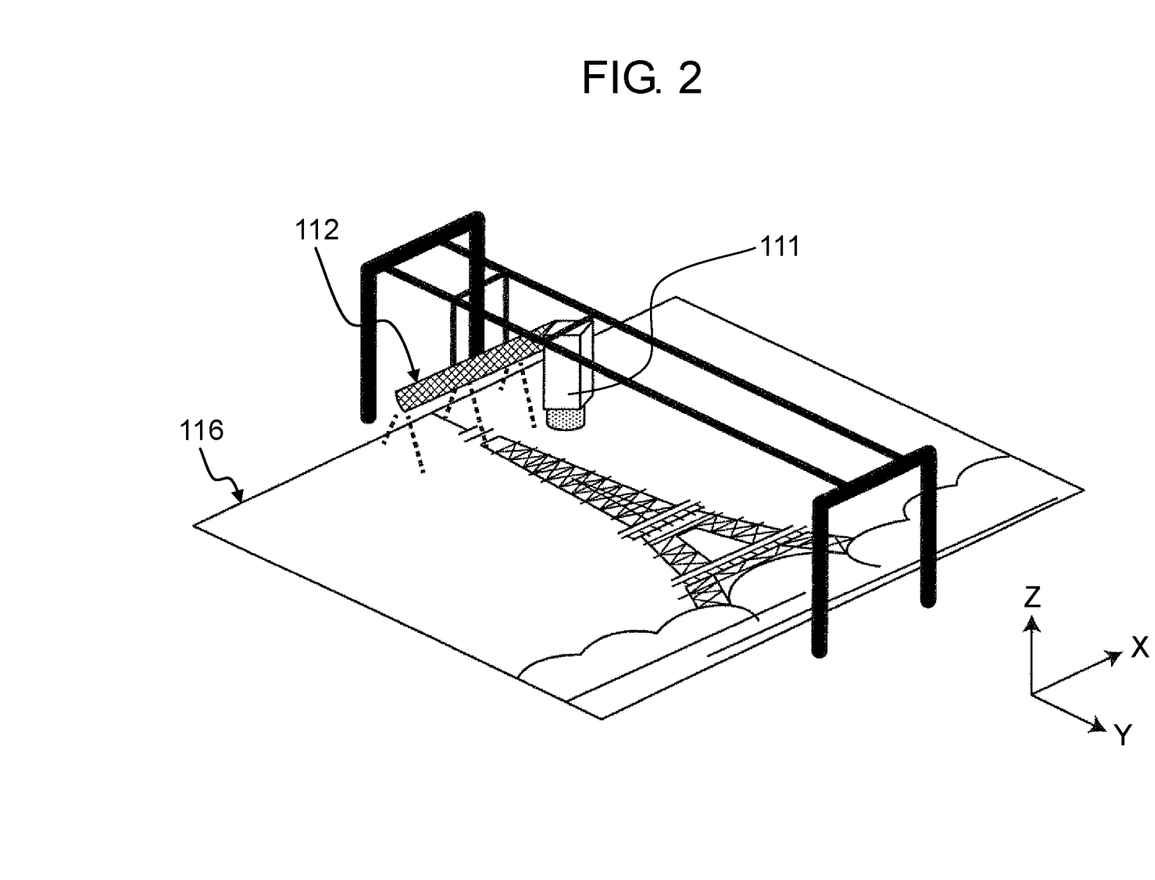
FIG. 2 is a perspective view of a conventional image pickup device.
Figure 3:
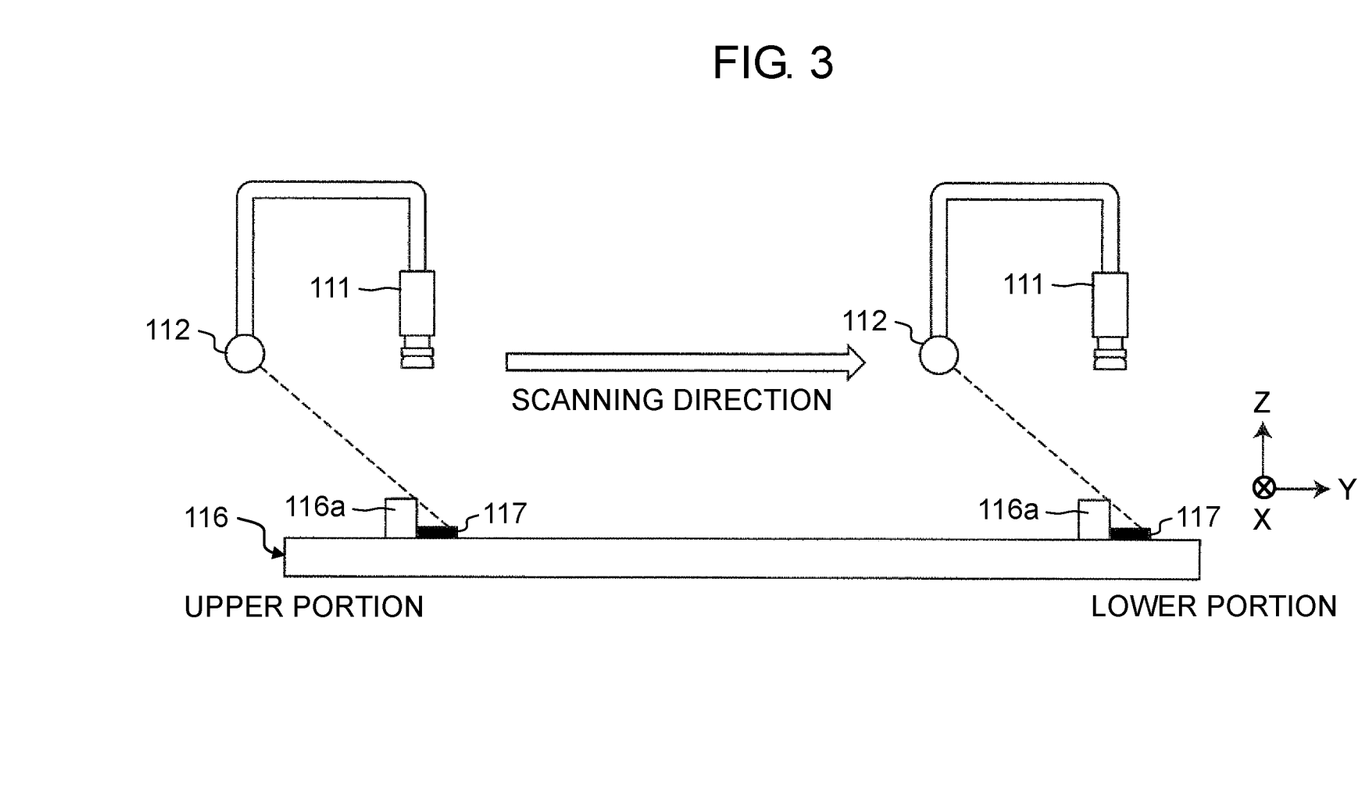
FIG. 3 is a side view of the conventional image pickup device.

FIG. 2 illustrates a conventional image pickup device in which camera 111 sequentially scans divided areas of object 116, such as a painting, to capture an image of entire object 116. During the scanning, illumination source 112 emits linearly diffused light to object 116 at an oblique angle, thereby creating the shadows of painted projections on object 116. As illustrated in FIG. 3, the relative position between camera 111 and illumination source 112 is fixed. In this case, if projections 116a on the painted surface of object 116 have the same level, shadows 117 of projections 116a created over the surface of object 116 are expected to have the same length.

Figure 4:
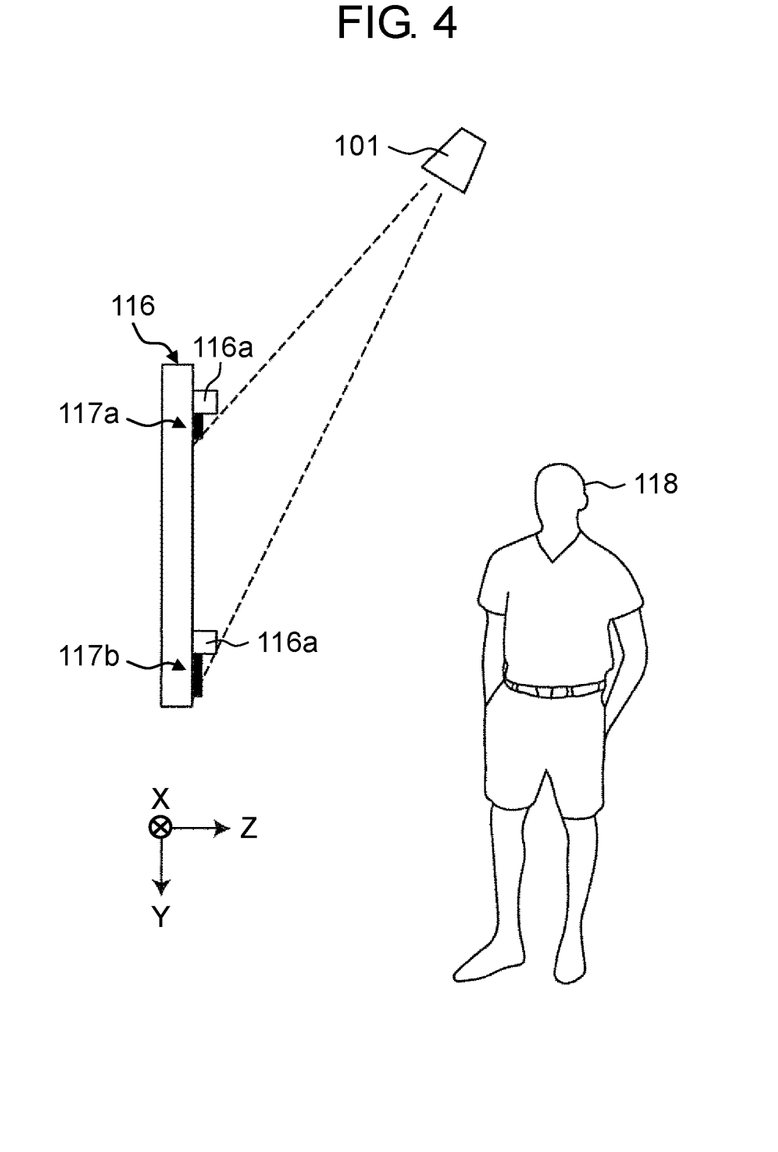
FIG. 4 is a schematic view of shadows of an object placed in an actual exhibition.

In many actual exhibitions of paintings, as illustrated in FIG. 4, object 116 is irradiated with light from illumination source 101, such as a spot light. In this case, upper shadow 117a of an upper portion of object 116 becomes shorter than lower shadow 117b of a lower portion of object 116, even if projections 116a on the painted surface of object 116 have the same level. This is because the upper and lower portions are irradiated with light from illumination source 101 at different angles.

For example, 40-sized (1.0 m×0.8 m) object 116 is installed with its vertical center positioned 1.6 meters above the floor, and illumination source 101, such as a spot light, is installed 1.0 m forward of object 116 and 3.0 m above the floor. If projections 116a of object 116 have a step height of 0.5 mm, shadow 117a of the upper portion of object 116 becomes approximately 0.45 mm long, and shadow 117b of the lower portion of object 116 becomes approximately 0.95 mm long.

The resolution of eye of person 118 is typically 0.35 mm when person 118 sees a 40-sized painting at a distance of 1.2 m, which is approximately 1.5 times the horizontal length of the painting. Therefore, person 118 is expected to be able to sufficiently recognize the difference in length between shadows 117a, 117b. This shadowing effect is believed to be one factor in providing a realistic image of a painting through a printed matter or a display unit.

The present disclosure provides an image pickup device that, when scanning an object to capture an image of the object, moves and adjusts an optical path of light from a light source used for the scanning, thereby reproducing illumination for an exhibition.

First Exemplary Embodiment

A first exemplary embodiment will be described below with reference to FIG. 1 and FIGS. 5 to 7.

[1-1. Configuration]

Figure 1:
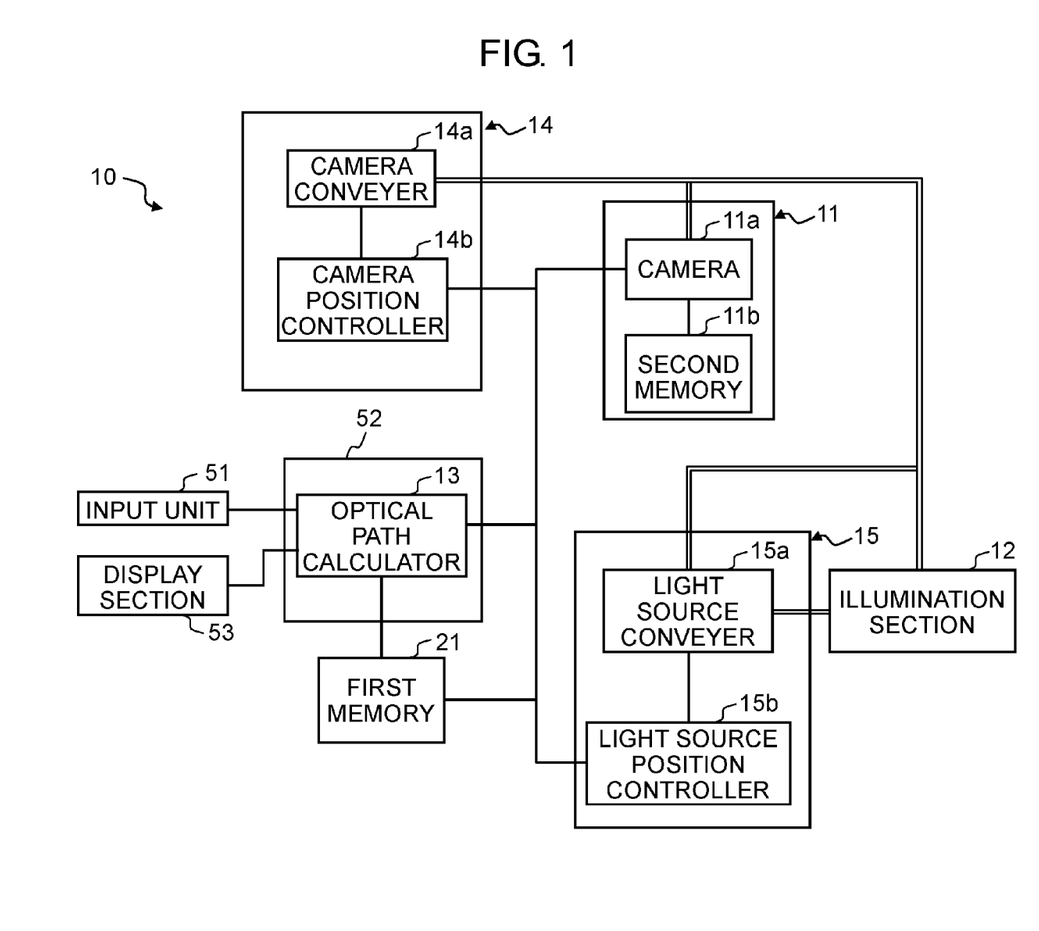
FIG. 1 is a block diagram of an image pickup device in a first exemplary embodiment of the present disclosure.

As illustrated in FIG. 1, image pickup device 10 in the first exemplary embodiment includes image pickup section 11, illumination section 12, optical path calculator 13, first conveyer 14, and second conveyer 15.

Image pickup section 11 includes camera 11a, such as a CCD line sensor, and second memory 11b as exemplary constituent elements. Camera 11a scans object 16 (see FIG. 5), such as a painting, to capture an image of object 16, and the image data is stored in second memory 11b.

Figure 5:
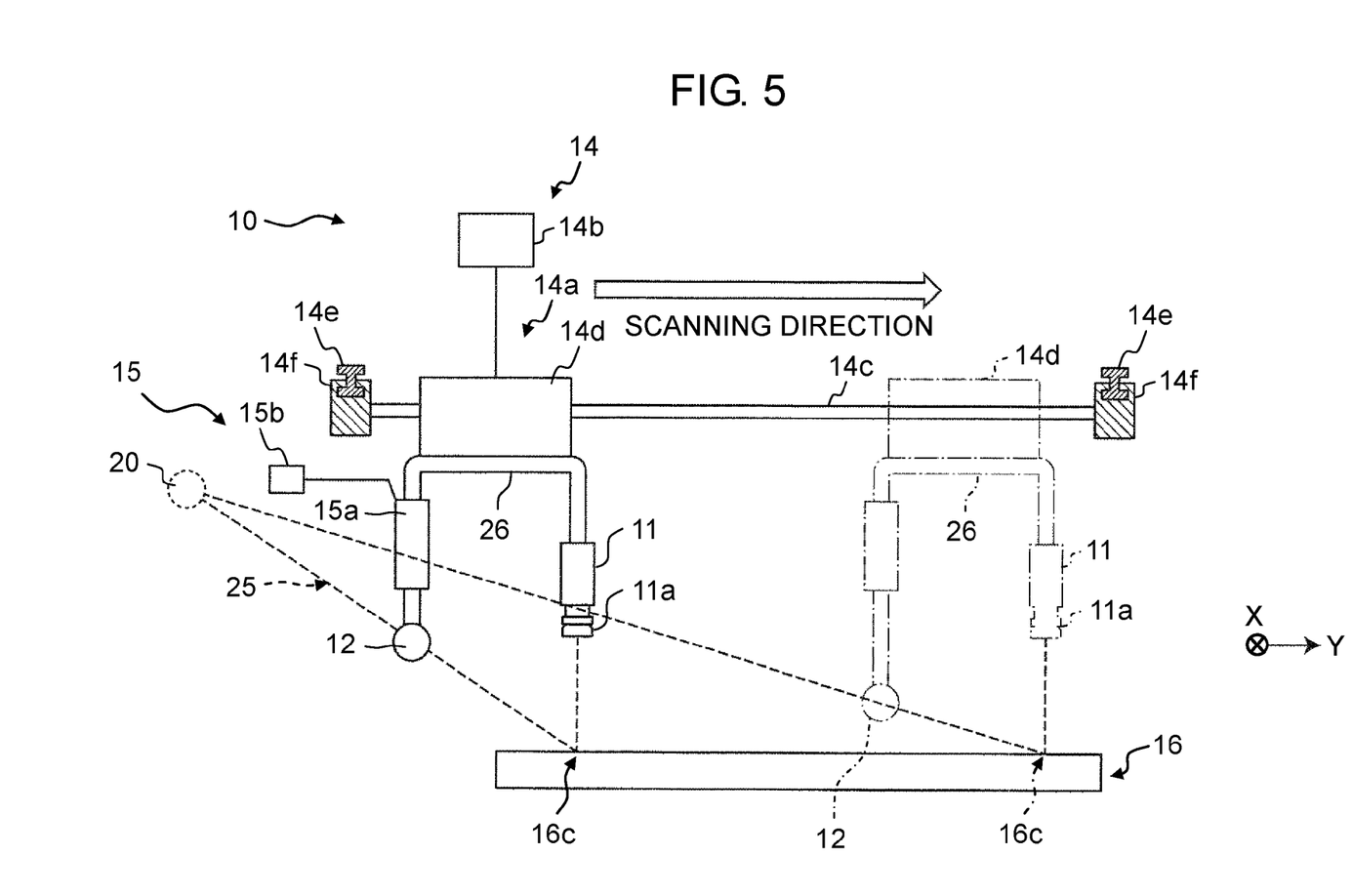
FIG. 5 is a side view of the image pickup device in the first exemplary embodiment.

As illustrated in FIG. 5, camera 11a is fixed to the front end of frame 26 in a scanning direction; frame 26 may have a U shape, for example. Illumination section 12 is vertically movably fixed to the rear end of frame 26 in the scanning direction with second conveyer 15 provided between the illumination section 12 and frame 26. First conveyer 14 is mounted on the center of frame 26.

If the optical axis of image pickup section 11 extends downward therefrom, for example, camera 11a captures an image of photographed part 16c of object 16 just below camera 11a and then acquires three-dimensional (3D) positional coordinates of photographed part 16c. The acquired 3D positional coordinates are stored in second memory 11b. The 3D positional coordinates may be acquired through image processing or using a sensor, for example.

Illumination section 12 is an illumination source to be used for scanning and irradiates an area of object 16 containing photographed part 16c with light, thereby casting shadows over object 16. This illumination source may be a high-color-rendering straight tube fluorescent lamp or a line light emitting diode (LED) lamp formed of an array of high-color-rendering white LEDs, for example.

Optical path calculator 13 calculates illumination optical path 25 extending from virtual illumination 20, which serves as a virtual illumination source that would be used for object 16 in an exhibition. Virtual illumination 20 may be a spot light or other illumination source that shines light on object 16 placed in an actual exhibition if object 16 is a painting, for example. Such an illumination source is typically fixed at a predetermined position. Illumination optical path 25 extending from virtual illumination 20 may be an optical path along which light travels from an illumination source fixed at a predetermined position to photographed part 16c of object 16.

Optical path calculator 13 acquires 3D, namely, X-axial, Y-axial, and Z-axial positional coordinates of virtual illumination 20 and object 16. These positional coordinates are stored in first memory 21. If necessary, optical path calculator 13 may also acquire initial positional coordinates of illumination section 12 and camera 11a before the scanning, and these initial positional coordinates may be stored in first memory 21. A user may preset or acquire these positional coordinates in computer 52 via input unit 51 implemented using a keyboard or mouse. Alternatively, a user may preset or acquire these positional coordinates in computer 52 via input unit 51 connected to an external server via the Internet.

Optical path calculator 13 calculates and determines virtual illumination optical path 25 along which light travels from the position of virtual illumination 20 to an area of object 16 containing photographed part 16c. Illumination optical path 25 may be defined as a range of positional coordinates, for example. Second conveyer 15 controls a position of illumination section 12 in such a way that illumination section 12 is always positioned within the plane containing illumination optical path 25.

Optical path calculator 13 may be implemented using a computer program in software or firmware, for example. This computer program is executable by computer 52 connected to display section 53, first memory 21, and input unit 51 that allows input information to be entered into computer 52. Display section 53 includes at least a display unit on which images and other information are displayed.

First conveyer 14 includes camera conveyer 14a and camera position controller 14b as exemplary constituent elements; camera conveyer 14a moves camera 11a in the scanning direction, and camera position controller 14b controls the movement of camera conveyer 14a.

As illustrated in FIG. 5, camera conveyer 14a includes, as exemplary constituent elements, first guide rail 14c, first movable body 14d, second guide rail 14e, and second movable body 14f and is movable in both X and Y directions. More specifically, first guide rail 14c extends in the Y direction, which coincides with a vertical direction of object 16 in an exhibited state. First movable body 14d is coupled to frame 26 and movable along first guide rail 14c in response to the driving of a motor, for example. Thus, the combination of first guide rail 14c and first movable body 14d allows camera conveyer 14a to move in the Y direction. Second guide rail 14e extends in the X direction, which coincides with a horizontal direction of object 16 in an exhibited state. Second movable body 14f is coupled to first guide rail 14c and movable along second guide rail 14e in response to the driving of a motor, for example. Thus, the combination of second guide rail 14e and second movable body 14f allows camera conveyer 14a to move in the X direction.

When camera 11a scans object 16 to capture an image of object 16, camera position controller 14b controls the driving of camera conveyer 14a in such a way that camera 11a and illumination section 12 are translated together in the scanning direction at a constant speed; hereinafter, the scanning direction is also referred to as the first direction. The scanning direction is not limited to the vertical direction of a painting and thus may be any direction as long as second conveyer 15 can position illumination section 12 within the plane containing illumination optical path 25. As one alternative example, the scanning direction may be selected from the vertical, horizontal, and oblique directions, in accordance with a position and orientation of object 16. If camera 11a cannot capture an image of an entire photographed area of object 16 with a single scan, camera 11a may scan the photographed area multiple times while moving in a direction perpendicular to the scanning direction by a predetermined distance. A moving speed, a scanning or moving direction, a moving distance of camera 11a may be stored in first memory 21 as moving information and used by optical path calculator 13.

Second conveyer 15 moves the optical path of the light from illumination section 12 into the plane containing illumination optical path 25, in accordance with the movement of both image pickup section 11 and illumination section 12 in the scanning direction. Second conveyer 15 functions as a mechanism for controlling a light source and includes light source conveyer 15a and light source position controller 15b as exemplary constituent elements; light source conveyer 15a moves illumination section 12, and light source position controller 15b controls the driving of light source conveyer 15a. Light source conveyer 15a is an elevating device that has a member engaging with a threaded shaft and, when a motor rotates in a forward or reverse direction, the threaded shaft rotates in the same direction, causing illumination section 12 to move vertically. Instead of the motor mechanism, light source conveyer 15a may be provided with an air cylinder mechanism.

In accordance with the movement of both image pickup section 11 and illumination section 12 made by first conveyer 14, light source position controller 15b controls the driving of light source conveyer 15a in such a way that illumination section 12 moves vertically. As a result, a position of illumination section 12 is kept within the plane containing illumination optical path 25. More specifically, in FIG. 5, in accordance with the movement of both image pickup section 11 and illumination section 12 in the Y direction (scanning direction), light source position controller 15b controls the driving of light source conveyer 15a in such a way that illumination section 12 gradually moves downward and illumination section 12 is always positioned within the plane containing illumination optical path 25.

Figure 7:
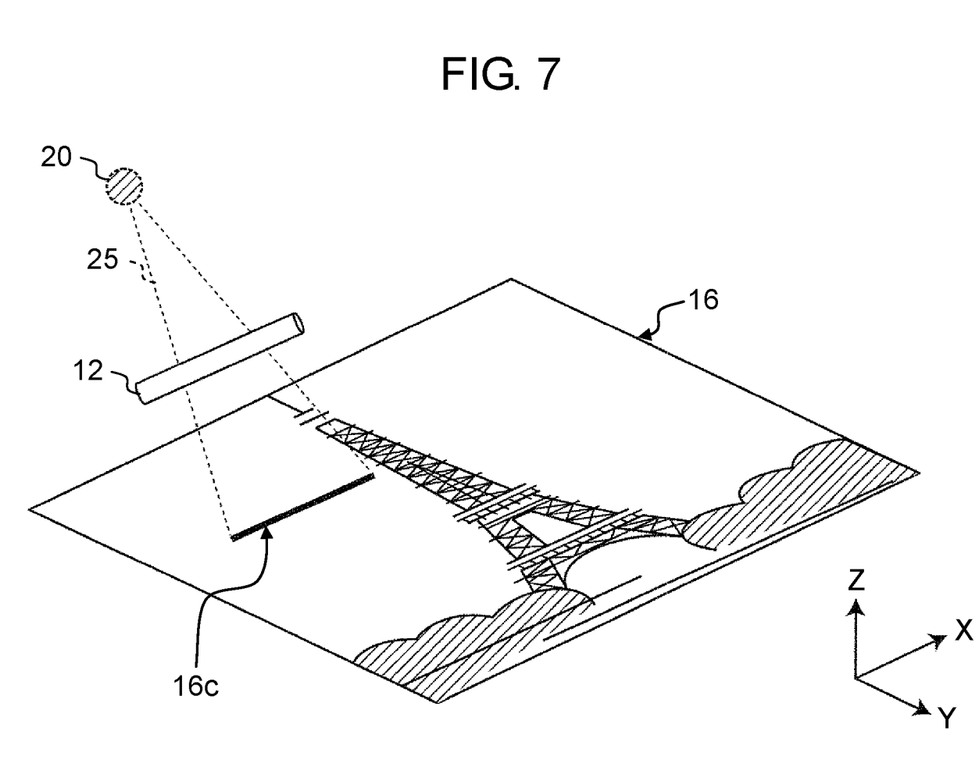
FIG. 7 is an explanatory schematic view of a control method in which the image pickup device in the first exemplary embodiment moves the illumination section within the plane containing an illumination optical path.

To keep illumination section 12 positioned within the plane containing illumination optical path 25, first, optical path calculator 13 calculates illumination optical path 25 related to photographed part 16c, based on the positional information (positional coordinates) regarding virtual illumination 20 and camera 11a. Then, as illustrated in FIG. 7, first conveyer 14 and second conveyer 15 move illumination section 12 into the plane containing triangle illumination path 25 formed by virtual illumination 20 and photographed part 16c. With the movement of camera 11a, optical path calculator 13 recalculates illumination optical path 25, and light source position controller 15b controls the driving of light source conveyer 15a in such a way that illumination section 12 is always positioned within the plane containing the recalculated illumination optical path 25. By keeping illumination section 12 positioned within the plane containing illumination optical path 25, object 16 can be scanned in a state where object 16 would be irradiated by a spot light or other illumination source in an exhibition. In this case, a user may enter and preset X-axial, Y-axial, and Z-axial positional coordinates of illumination section 12 and camera 11a in computer 52 before the scanning starts. Alternatively, a sensor may automatically acquire those positional coordinates. After that, light source position controller 15b controls the driving of light source conveyer 15a in such a way that illumination section 12 is always positioned within the plane containing illumination optical path 25 calculated by optical path calculator 13.

[1-2. Operation]

Figure 6:
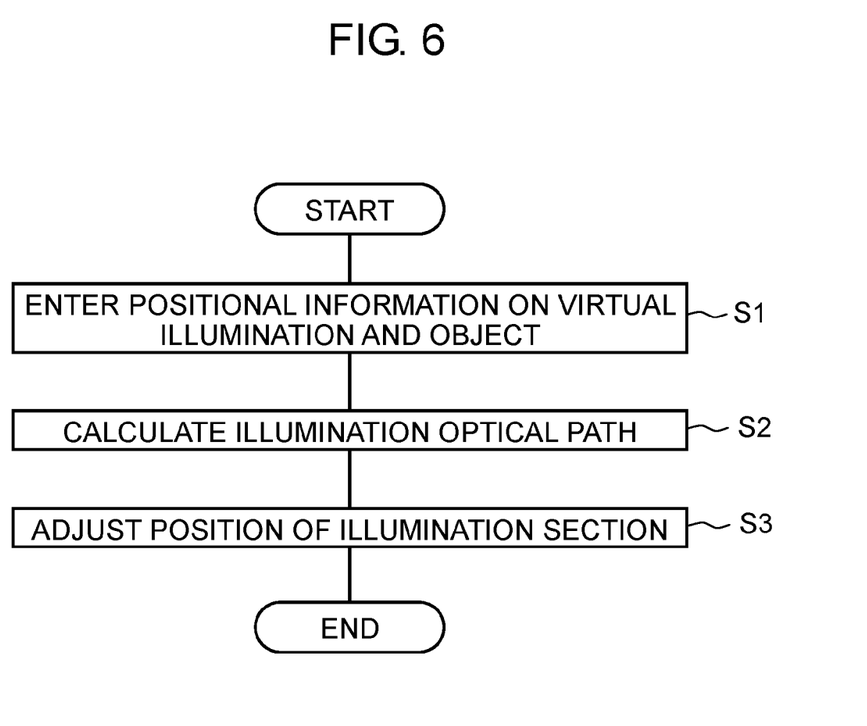
FIG. 6 is a flowchart of an imaging operation performed by the image pickup device in the first exemplary embodiment.

An imaging operation performed by image pickup device 10 will be described below with reference to FIG. 6.

At Step S1, first, a user enters positional information on virtual illumination 20 and object 16 in an exhibited state into computer 52 via input unit 51. More specifically, the user operates input unit 51 to store positional coordinates of virtual illumination 20 and photographed part 16c of object 16, such as a painting, in first memory 21 in advance. If necessary, the user may also enter positional coordinates of illumination section 12 and camera 11a into first memory 21 before the scanning starts.

At Step S2, optical path calculator 13 calculates illumination optical path 25. More specifically, optical path calculator 13 calculates a plane containing illumination optical path 25 extending from virtual illumination 20 to each photographed part 16c of object 16, based on the positional information on illumination section 12, camera 11a, and virtual illumination 20 and moving information on camera 11a. In this case, the moving information on camera 11a may contain a moving speed, a scanning or moving direction, and a distance for each moving step, for example. Illumination optical path 25 extending from virtual illumination 20 to each photographed part 16c of object 16 may correspond to an optical path of light from an illumination source that would be used for an exhibition. Then, optical path calculator 13 stores the calculation result in first memory 21.

At Step S3, light source position controller 15b adjusts a position of illumination section 12. More specifically, light source position controller 15b adjusts a position of illumination section 12, based on the information on illumination optical path 25 related to each photographed part 16c and the moving information on camera 11a stored in first memory 21, in such a way that illumination section 12 is positioned within the plane containing illumination optical path 25 related to each photographed part 16c.

As a result of the above imaging operation, illumination section 12 is always positioned within the plane containing illumination optical path 25 while camera 11a is moving to scan object 16 and capture an image of object 16. Thus, performing the imaging operation in this manner enables camera 11a to scan object 16 and capture an image of object 16 in a state where object 16 would be irradiated by a spot light or other illumination source in an exhibition. Consequently, it is possible to acquire an image of an object in which shadows are created in accordance with illumination for an exhibition.

[1-3. Function and Effect]

According to the first exemplary embodiment, when camera 11a scans object 16 to capture an image of object 16, first conveyer 14 translates both camera 11a and illumination section 12 in the first direction. Simultaneously with the movement of camera 11a, second conveyer 15 moves illumination section 12 into the plane containing illumination optical path 25. This enables camera 11a to scan object 16 and capture an image of object 16 in a state where object 16 would be irradiated by a spot light or other illumination source in an exhibition. Consequently, it is possible to provide an image of an object in which shadows are created in accordance with illumination for an exhibition.

As a result of the above, if object 16 is a painting, shadows of object 16 are created non-uniformly over the surface of a resultant image. More specifically, a shadow of an upper portion of the painting image differs in length from a shadow of a lower portion of the painting image as though the painting were actually placed in an exhibition. Thus, it is possible to provide a realistic scanned image through a printed matter or an electrical display unit.

Image pickup section 11 and illumination section 12 do not necessarily have to be integrated with each other. However, if image pickup section 11 and illumination section 12 are integrated, a single drive system can be used to move both image pickup section 11 and illumination section 12, which leads to a simple configuration. In the first exemplary embodiment, second conveyer 15 moves illumination section 12 into the plane containing illumination optical path 25. However, there is no limitation on a mechanism for moving the light from illumination section 12. As one alternative example, image pickup device 10 may include a mechanism made up of multiple optical members including a reflecting mirror, and this mechanism may align optical path 22 along which light travels from illumination section 12 to photographed part 16c of object 16 with illumination optical path 25. In short, image pickup device 10 may include any mechanism that can move the optical path of the light from illumination section 12 into the plane containing illumination optical path 25 by using second conveyer 15.

Second Exemplary Embodiment

A second exemplary embodiment will be described below with reference to FIGS. 8A to 12D.

Problem with Conventional Art

Figure 8A:
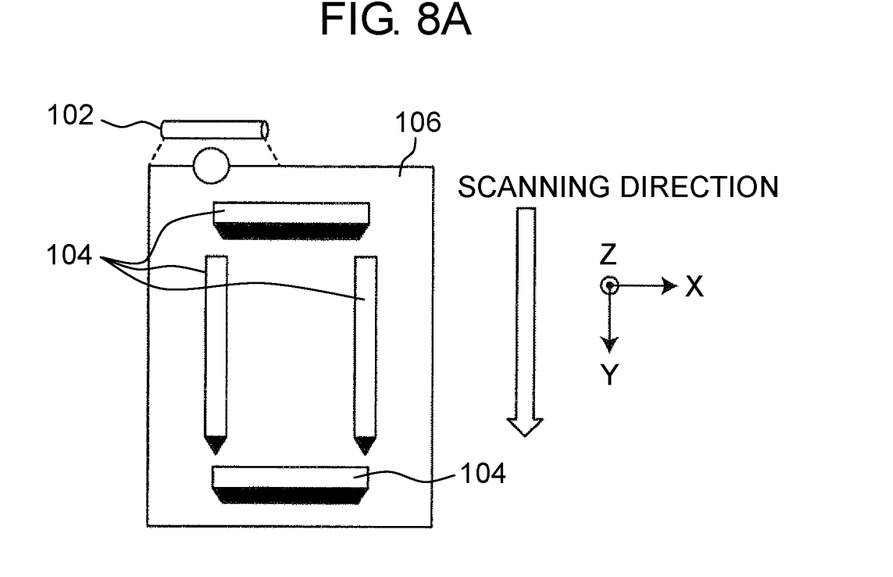
FIG. 8A is a schematic view of shadows of an object which are created in a conventional image pickup device.

FIG. 8A illustrates a conventional image pickup device in which linear illumination source 102 is disposed with its long sides being vertical to the scanning direction, or being parallel to scanned lines. When this image pickup device captures an image of object 106, such as a painting, a problem may be arise in that shadows of projections 104 on object 106 are created in the scanning direction but not created in a direction vertical to the scanning direction, namely, a longitudinal direction of the linear illumination source.

Figure 8B:
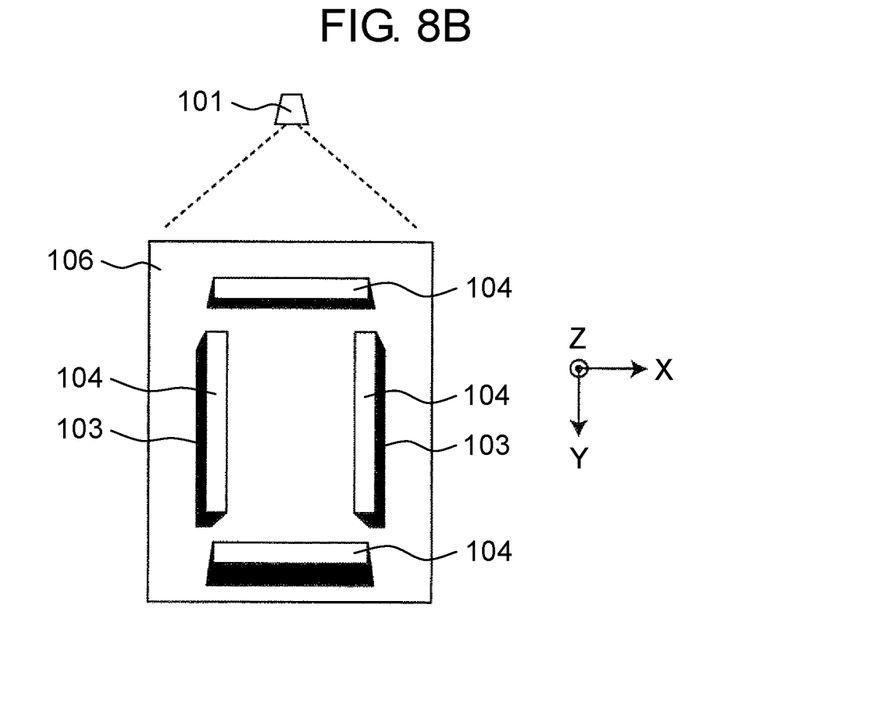
FIG. 8B is a schematic view of shadows of an object placed in an actual exhibition.

In many exhibitions, as illustrated in FIG. 8B, object 106 is irradiated with light by illumination source 101, such as a spot light, positioned above the horizontal center of object 106. In this case, shadows 103 of projections 104 on object 106 are extended toward the edges of object 106. This shadowing effect is also believed to be one factor in providing a realistic image through a printed matter or a display unit.

In fact, by installing a photographic illumination source at the same position as in an actual exhibition, shadows can be created as though object 106 were placed in an exhibition. However, if an object is scanned by a CCD line sensor or other camera, the shadows of the camera and a moving mechanism of the camera may also be cast over photographed part 16c of the object. This might inhibit the imaging operation from being performed appropriately.

An image pickup device in the second exemplary embodiment successfully overcomes the above problem.

[2-1. Configuration]

Figure 9:
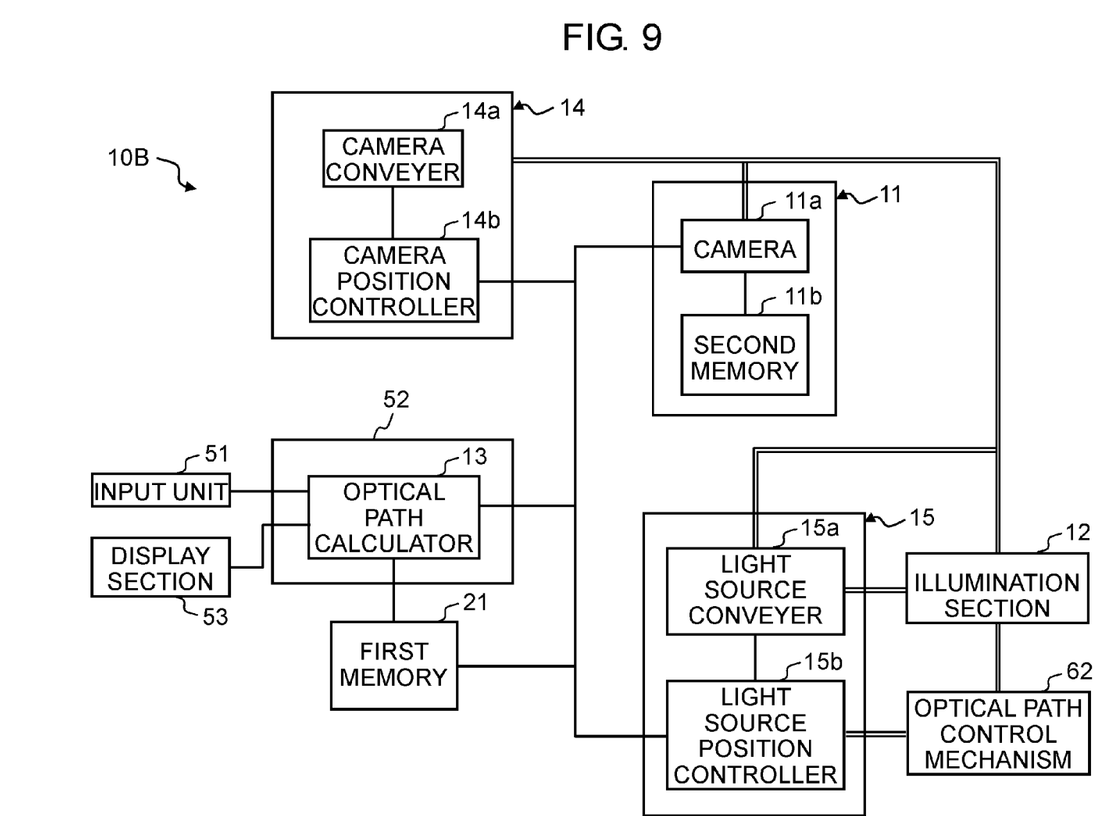
FIG. 9 is a block diagram of an image pickup device in a second exemplary embodiment of the present disclosure.
Figure 10:
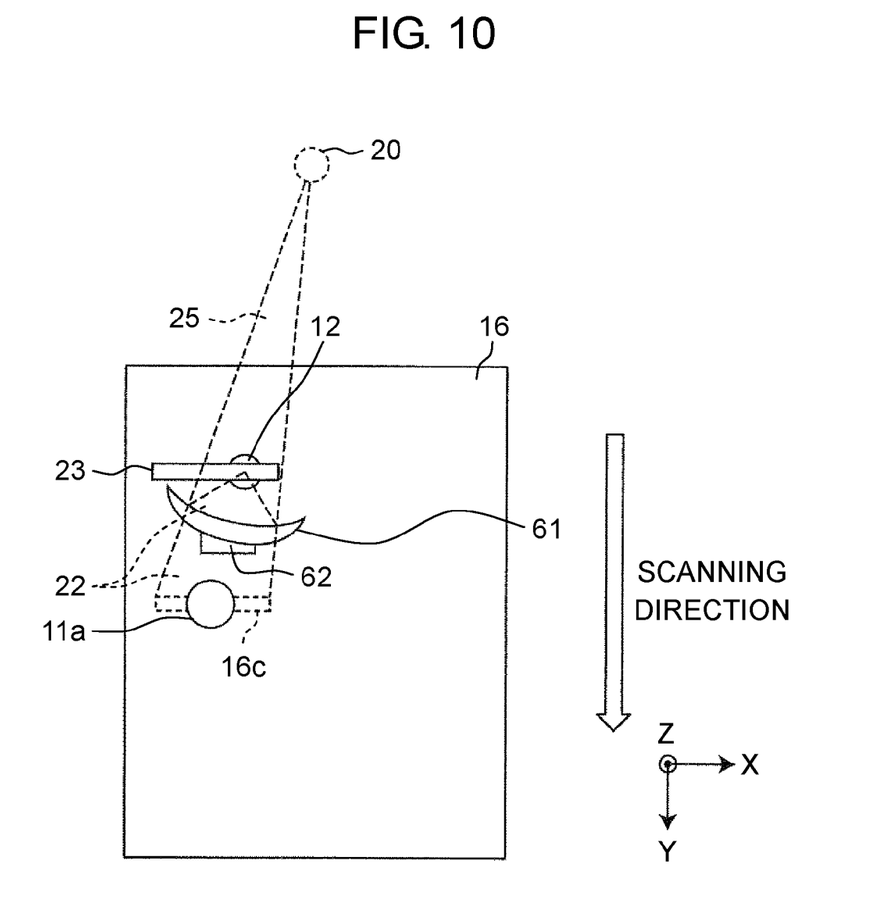
FIG. 10 is an explanatory schematic view of an operation performed by the image pickup device in the second exemplary embodiment.

As illustrated in FIGS. 9 and 10, image pickup device 10B in the second exemplary embodiment includes optical path adjusting lens 61 and optical path control mechanism 62, in addition to the constituent elements of image pickup device 10 in the first exemplary embodiment. Optical path adjusting lens 61 is disposed between illumination section 12 and object 16 and adjusts an optical path component within the plane containing illumination optical path 25. In this case, illumination section 12 may be a point light source.

For example, optical path adjusting lens 61 may include one or more lenses and deflects or collects light from illumination section 12.

Optical path control mechanism 62 moves the lenses of optical path adjusting lens 61, for example by rotating these lenses at a predetermined angle with a motor or other driving device, thereby adjusting an optical path component contained in the light from illumination section 12. More specifically, optical path control mechanism 62 mechanically and optically corrects a position of illumination section 12 and optical path 22 of light from illumination section 12 in conjunction with second conveyer 15 such that optical path 22 of light from illumination section 12 becomes aligned with illumination optical path 25 calculated by optical path calculator 13 as seen from the front of object 16, such as a painting. Employing this configuration makes it possible to align optical path 22 along which the light travels from illumination section 12 to photographed part 16c with illumination optical path 25 for an exhibition when capturing an image of object 16. Consequently, it is possible to cast shadows over object 16 in both the scanning direction and its vertical direction, thereby providing a more realistic image through a printed matter or a display unit.

A position of illumination section 12 may be adjustable in a direction intersecting the scanning direction, such as the X direction perpendicular to the scanning direction, by third conveyer 23 that serves as an illumination source position adjuster. A position of illumination section 12 may be adjusted either manually or automatically. If the adjustment is made automatically, a mechanism that includes, as an exemplary constituent element, an air cylinder or a direct acting device provided with a motor and a threaded shaft may linearly move illumination section 12. Employing this configuration makes it possible to adjust an optical path of the light from illumination section 12 over a wide range.

[2-2. Operation]

Figure 11:
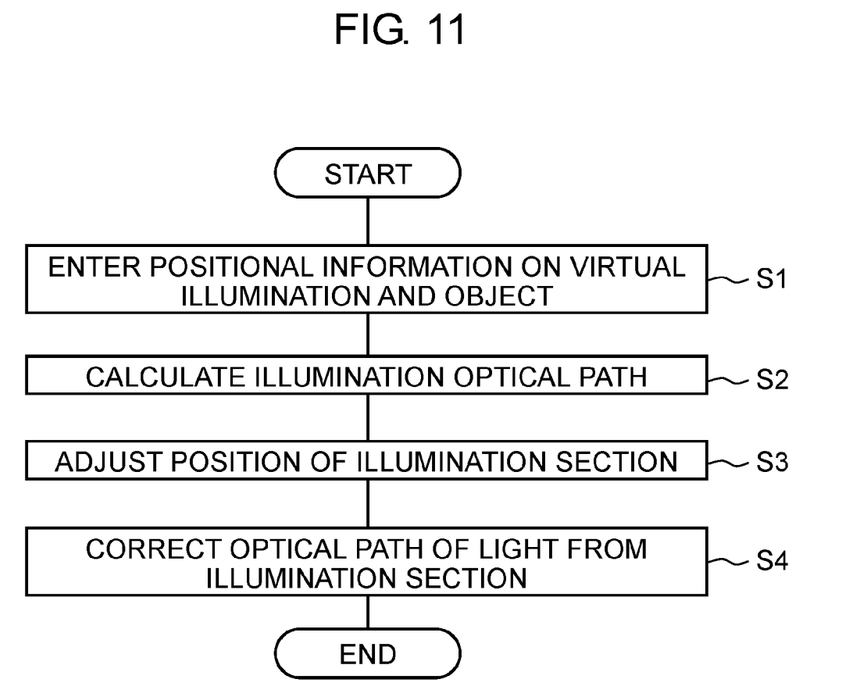
FIG. 11 is a flowchart of an imaging operation performed by the image pickup device in the second exemplary embodiment.

An imaging operation performed by image pickup device 10B will be described below with reference to FIG. 11.

In the second exemplary embodiment, Step S4 is performed after Step S3 of the first exemplary embodiment. Steps S1 to S3 are the same as in the first exemplary embodiment and therefore will not be described.

After Step S3, at Step S4, optical path adjusting lens 61 and optical path control mechanism 62 correct optical path 22 of light from illumination section 12, based on the information on illumination optical path 25. Hereinafter, details of Step S4 will be described with reference to FIGS. 12A, 12B, 12C, and 12D. In this case, a position of illumination section 12 is adjustable in the X direction perpendicular to the scanning direction by third conveyer 23.

Figure 12A:
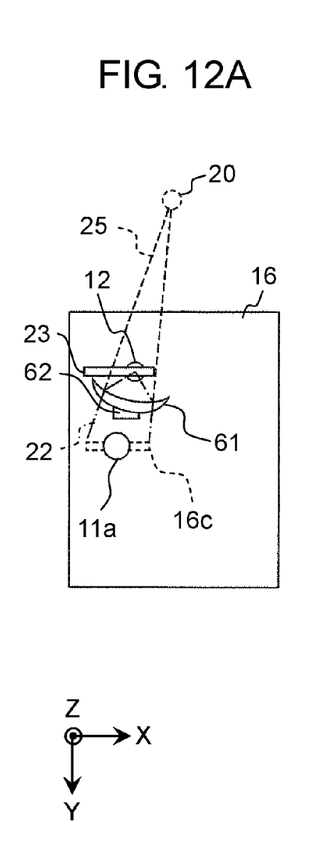
FIG. 12A is an explanatory schematic view of a process in which the optical path control mechanism in the image pickup device in the second exemplary embodiment adjusts an optical path.
Figure 12B:
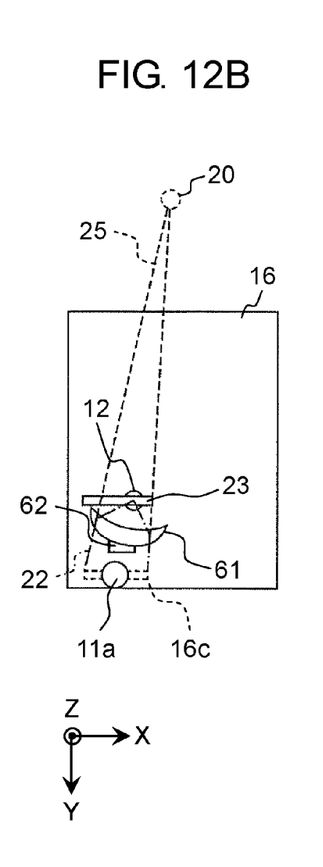
FIG. 12B is an explanatory schematic view of the process in which the optical path control mechanism in the image pickup device in the second exemplary embodiment adjusts an optical path.
Figure 12C:
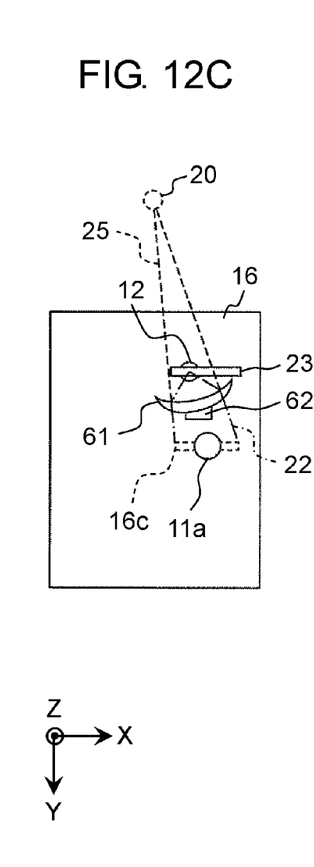
FIG. 12C is an explanatory schematic view of the process in which the optical path control mechanism in the image pickup device in the second exemplary embodiment adjusts an optical path.
Figure 12D:
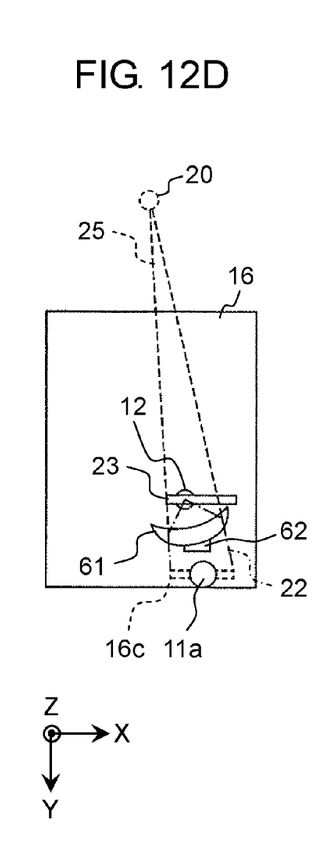
FIG. 12D is an explanatory schematic view of the process in which the optical path control mechanism in the image pickup device in the second exemplary embodiment adjusts an optical path.

FIG. 12A illustrates an exemplary case where camera 11a is disposed over object 16 at an upper left position as seen from the front of object 16. In this case, optical path control mechanism 62 relatively decreases the degree to which optical path adjusting lens 61 refracts the light, and illumination section 12 is disposed near the right end of third conveyer 23. FIG. 12B illustrates an exemplary case where camera 11a is disposed over object 16 at a lower left position as seen from the front of object 16. In this case, optical path control mechanism 62 relatively increases the degree to which optical path adjusting lens 61 refracts the light, and illumination section 12 is disposed between the center and right end of third conveyer 23. FIG. 12C illustrates an exemplary case where camera 11a is disposed over object 16 at an upper right position as seen from the front of object 16. In this case, optical path control mechanism 62 relatively decreases the degree to which optical path adjusting lens 61 refracts the light, and illumination section 12 is disposed near the left end of third conveyer 23. FIG. 12D illustrates an exemplary case where camera 11a is disposed over object 16 at a lower right position as seen from the front of object 16. In this case, optical path control mechanism 62 relatively increases the degree to which optical path adjusting lens 61 refracts the light, and illumination section 12 is disposed between the center and left end of third conveyer 23. In this way, optical path control mechanism 62 changes locations of one or more lenses in optical path adjusting lens 61, thereby adjusting the degree to which optical path adjusting lens 61 refracts the light. This can vary an angle that optical path 22 of the light from illumination section 12 forms with object 16, thus aligning optical path 22 with illumination optical path 25.

[2-3. Function and Effect]

According to the second exemplary embodiment, second conveyer 15 and third conveyer 23 adjust a position of illumination section 12. In addition, optical path control mechanism 62 corrects optical path 22 of the light from illumination section 12 such that optical path 22 becomes aligned with illumination optical path 25. Employing this configuration makes it possible to reproduce illumination and shadowing effects that would be produced in an exhibition with high precision. This enables image pickup section 11 to capture an image of object 16 in which shadows are created as though object 16 were placed in an exhibition. Thus, it is possible to provide a more realistic scanned image through a printed matter or an electrical display unit. Moreover, optical path control mechanism 62 can adjust the optical path such that illumination section 12 is uniformly irradiated with parallel light, in which case an exhibition scene in which object 16 is irradiated with natural light is reproduced.

In the second exemplary embodiment, image pickup section 11 and illumination section 12 may also be translated together in the first direction, as in the first exemplary embodiment. In addition, second conveyer 15 moves the light from illumination section 12 into the plane containing illumination optical path 25. However, there is no limitation on a mechanism for moving the light from illumination section 12. As one alternative example, image pickup device 10 may include a mechanism made up of multiple optical members including a reflecting mirror, and this mechanism may align optical path 22 along which the light travels from illumination section 12 to photographed part 16c of object 16 with illumination optical path 25.

(Modification)

Optical path calculator 13 may calculate a distance from virtual illumination 20 to photographed part 16c in accordance with the movement of camera 11a made by first conveyer 14. In addition, illumination section 12 may adjust an intensity of light from illumination section 12, based on the distance from virtual illumination 20 to photographed part 16c.

Employing the above configuration enables image pickup section 11 to capture an image of object 16 under an irradiation condition substantially the same as in an actual exhibition.

If an illumination source is installed above a painting in an actual exhibition, an upper portion of the painting is irradiated relatively strongly but a lower portion of the painting is irradiated relatively weakly. The configuration in this modification can reflect this irradiation difference caused in an actual exhibition on a resultant image, thereby providing a more realistic image through a printed matter or a display unit.

Other Embodiments

The first and second exemplary embodiments have been described as exemplary techniques disclosed in this application. However, the techniques of the present disclosure are not limited to these first and second exemplary embodiments, and thus applicable to embodiments undergoing appropriate variations, substitutions, additions, and/or omissions. Furthermore, by combining some of the constituent elements in first and second exemplary embodiments, some additional embodiments may be contemplated.

Other embodiments will be described below.

As one example, optical path calculator 13, camera position controller 14b, or light source position controller 15b in the first and second exemplary embodiments may be implemented using computer 52. However, such a calculator or controller may have any physical configuration that can control the image pickup device. Therefore, the calculator or controller is not limited to a computer. Nevertheless, if a programmable device, such as a computer, is used as the calculator or controller, the image pickup device can be designed flexibly, because it is possible to modify processes by changing programs. As one alternative example, the calculator or controller in the first and second exemplary embodiments may be implemented using hardware logic.

Implementing the calculator or controller in hardware logic is effective in accelerating a process. Furthermore, the calculator or controller may be implemented using either a single physical element or a plurality of physical elements. If the calculator or controller is implemented using a plurality of physical elements, the controls described in the claim may be performed by independent elements. In this case, these independent elements can be considered to configure the calculator or controller. Moreover, by combining the calculator or controller with a member having a different function, a single element may be configured.

The first, second, and other exemplary embodiments have been described as exemplary techniques disclosed in the present disclosure. For that purpose, the accompanying drawings and the detailed description have been provided.

The constituent elements described in the accompanying drawings and the detailed description may include not only ones essential to overcome conventional problems but also nonessential ones for use in describing examples of the technique. Therefore, it is understood that all the constituent elements described in the accompanying drawings and the detailed description should not be regarded as being essential.

The foregoing first, second, and other exemplary embodiments disclose exemplary techniques of the present disclosure. Therefore, the first, second, and other exemplary embodiments may be modified, substituted, added, and/or omitted in various ways within the scopes of the claim and its equivalents. As one example, combining some of the exemplary embodiments and modifications as appropriate can produce any synergistic effect. As another example, different exemplary embodiments, different examples, and/or an exemplary embodiment and an example may be combined with each other. Features of different exemplary embodiments and/or examples may also be combined.

The present disclosure is applicable to image pickup devices that are capable of acquiring an image of an object in which a shadow is created in accordance with illumination for an exhibition. More specifically, the present disclosure is applicable to image pickup devices used to archive digital image data concerning paintings, including oil paintings, and other art objects.

What is claimed is:

1. An image pickup device comprising:
   an image pickup section that captures an image of an object;
   an illumination section that irradiates the object with light to cast a shadow over the object;
   a calculator that calculates an illumination optical path extending from a virtual illumination;
   a first conveyer that moves the image pickup section and the illumination section in a first direction when the image pickup section scans the object to capture the image of the object; and
   a second conveyer that moves the light from the illumination section into a plane containing the illumination optical path, in accordance with the movement of the image pickup section and the illumination section in the first direction.

2. The image pickup device according to claim 1, wherein when the image pickup section scans the object to capture the image of the object, the first conveyer translates both the image pickup section and the illumination section together in the first direction.

3. The image pickup device according to claim 1, further comprising:
   an optical path adjusting lens that deflects or collects the light from the illumination section, the optical path adjusting lens being disposed between the illumination section and the object; and
   an optical path control mechanism that moves the optical path adjusting lens to adjust an optical path component within a plane containing the illumination optical path, the optical path component being contained in the light from the illumination section.

4. The image pickup device according to claim 1, further comprising
   a third conveyer that moves the illumination section in a direction intersecting the first direction.

5. The image pickup device according to claim 1, wherein
   the calculator calculates a distance from the virtual illumination to a photographed part, in accordance with the movement of the image pickup section, and
   the illumination section adjusts an intensity of the light from the illumination section, based on the distance.

* * * * *